United States Patent
Leduc

[15] 3,653,313
[45] Apr. 4, 1972

[54] EXPOSURE COUNTER FOR SINGLE-LENS REFLEX CAMERA

[72] Inventor: Robert D. Leduc, Marlboro, Mass.

[73] Assignee: Polaroid Corporation, Cambridge, Mass.

[22] Filed: Dec. 29, 1970

[21] Appl. No.: 102,435

[52] U.S. Cl. ................................................95/42
[51] Int. Cl. ............................................G03b 19/12
[58] Field of Search........................................95/42

[56] References Cited

UNITED STATES PATENTS 2,256,517   9/1941   Cohen ................................95/42

Primary Examiner—Samuel S. Matthews
Assistant Examiner—E. M. Bero
Attorney—Brown and Mikulka, Alfred E. Corrigan and Lawrence G. Norris

[57] ABSTRACT

A camera of the single-lens reflex type having a reflecting member mounted for movement between first and second positions and an exposure counter coupled to an actuated by the movement of the reflecting member between the first and second positions. The camera also includes a lever and pawl system for automatically resetting the exposure counter upon removal of a film container from the camera.

10 Claims, 3 Drawing Figures

INVENTOR.
ROBERT D. LEDUC

BY
Brown and Mikulka
and
Alfred E. Corrigan
ATTORNEYS

INVENTOR.
ROBERT D. LEDUC

3,653,313

EXPOSURE COUNTER FOR SINGLE-LENS REFLEX CAMERA

BACKGROUND OF THE INVENTION

1. Field of the Invention

This invention relates to photographic apparatus of the single-lens reflex type in which an exposure counter capability is provided.

2. Description of the Prior art

It is customary to provide photographic apparatus of the single-lens reflex type with an exposure or pose counter so as to convey certain information to the user regarding the number of exposures which have been made or which remain in the film assemblage located within the photographic apparatus. Exposure counters generally include an indicia-bearing member having characters thereon which are sequentially presented at a viewing station, usually a window in the apparatus, for conveying this information to the user. Usually, the characters are sequentially changed by an indexing system coupled to film advancing apparatus which in turn is manually operated by a hand crank located on the camera as shown in U.S. Pat. Nos. 2,608,922 and 2,552,275. Operation of the hand crank advances a frame into position for exposure and simultaneously indexes the exposure counter to change the character present at the viewing station. Needless to say, manual operation of the crank leaves something to be desired. Further, many exposure counters are unduly complicated in construction and operation, and are often positioned in locations within the apparatus having limited accessibility, thereby making it more difficult to reset them to their starting position subsequent to the exposure of the last film unit or frame in the film assemblage. One solution proposed to the problem of resetting the exposure counter is described in U.S. Pat. No. 2,813,469; namely, an arrangement whereby opening the camera's door will automatically reset the camera's exposure counter to its starting position. However, opening the camera's door is not necessarily connected with the act of providing the camera with a fresh supply of film and therefore does not necessarily ensure that the counter will be properly oriented prior to the next exposure. For example, after one or more film units have been exposed, should the camera's door be opened for purposes of viewing the film container to ascertain if it is correctly positioned within the camera or for inspection of one of the components of the camera, such as the processing rollers in a camera of the self-developing type, the counter would be automatically reset thereby resulting in the exposure number of the counter being out of phase with the number of the next exposure.

SUMMARY OF THE INVENTION

The present invention relates to photographic apparatus of the single-lens reflex type and to an exposure counter for use therewith. The photographic apparatus includes a reflecting member mounted for movement between first and second positions and indexing means coupled between the reflecting member and the exposure counter for sequentially advancing the characters on the exposure counter during each cycle of the reflecting member between the first and second positions. The exposure counter is provided with a first pawl which prevents movement of the exposure counter in a predetermined direction and a second pawl, the second pawl being moved in response to removal of a film container from the apparatus to move the first pawl and the indexing means out of engagement with the exposure counter for allowing the latter to automatically reset itself to a starting position.

An object of the invention is to provide in photographic apparatus of the single-lens reflex type including a reflecting member mounted for movement between first and second positions and an exposure counter, means responsive to movement of the reflecting member between the first and second positions for sequentially indexing the exposure counter.

Another object of the invention is to provide in apparatus of the type set forth above, means responsive to removal of a film container from the apparatus for automatically resetting the exposure counter to its original or starting position.

Still another object of the invention is to provide in apparatus of the type set forth above, means for preventing indexing of the exposure counter after the exposure counter has reached a predetermined position.

Other objects of the invention will in part be obvious and will in part appear hereinafter.

This invention accordingly comprises the apparatus possessing the construction, combination of elements and arrangements of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
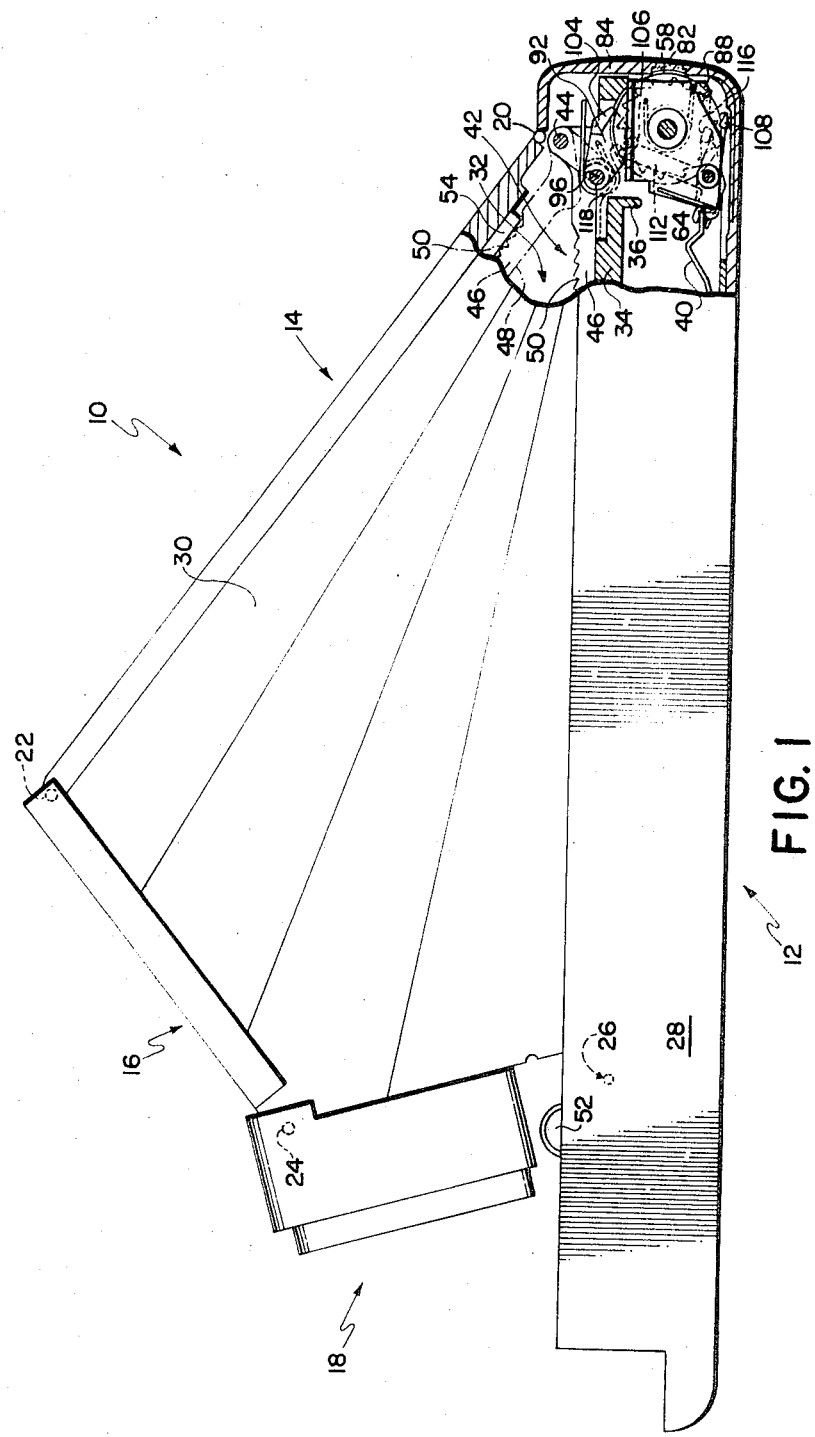
FIG. 1 is an elevational view, partly in section, of photographic apparatus of the single-lens reflex type.

Reference is now made to FIG. 1 of the drawings wherein is shown photographic apparatus in the form of a single-lens reflex type camera 10. Camera 10 includes a plurality of housing sections 12, 14, 16 and 18 pivotally coupled to each other about hinge points generally indicated at 20, 22, 24 and 26 for movement between an extended operative position, as shown, and a collapsed position wherein housing section 18 lies within side walls 28 of housing section 12 (only one of which is shown) and housing sections 14 and 16 lie within the same plane and form extensions of each other. The housing sections cooperate with a flexible bellows 30 having memory creases for ensuring proper folding for defining a lighttight exposure chamber 32.

Figure 2:
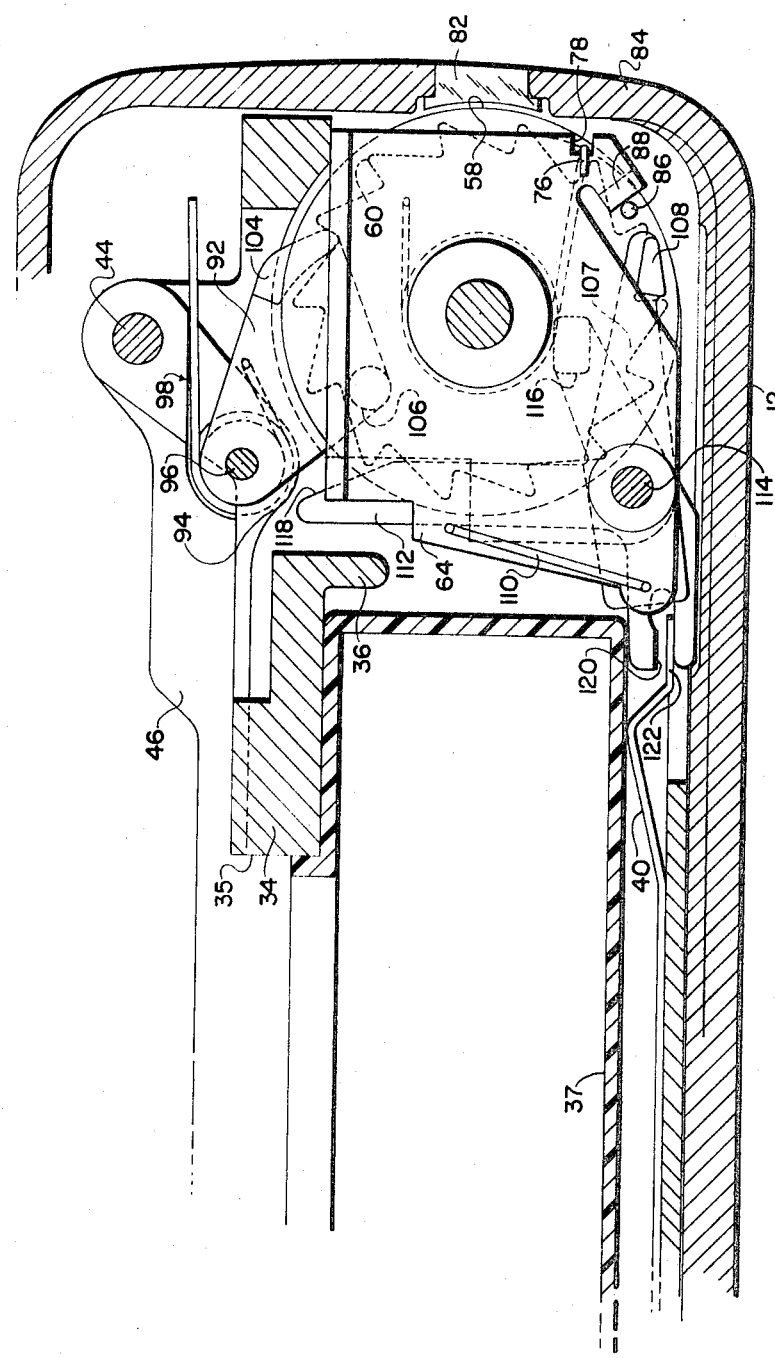
FIG. 2 is an enlarged sectional view of the sectioned portion of FIG. 1.

Housing section 12 includes a frame member 34 having an exposure aperture therein (not shown) and a depending flange 36 for properly locating a film container 37 (see FIG. 2) 2) in place with the forwardmost film unit (not shown) located within the assemblage positioned for exposure. Mounted on a bottom wall of housing section 12 is a resilient member 40 which is adapted to be moved downwardly by the film container 37 upon insertion of the latter into housing section 12, as will be more clearly explained hereinafter.

Located within the exposure chamber 32 is a reflecting member 42 pivotally mounted at 44 for movement between a first position (shown in broken lines) in which it functions as a component of the camera's exposure system and a second position (shown in solid lines) wherein it functions as a component of the camera's viewing system. More specifically, reflecting member 42 includes a support member 46 having a mirror 48 attached to one side thereof and an echelon-type mirror 50 mounted on the opposite side thereof. In the first position (broken line) of the reflecting member 42, mirror 48 receives light admitted by a conventional lens and shutter mounted within housing section 18 and redirects the light toward the exposure aperture in frame member 34 for exposing the forwardmost film unit located in position for exposure. After exposure of the film unit, reflecting member 42 is pivoted to the second position wherein it forms a lighttight seal with frame member 34 for preventing exposure of the next succeeding film unit. Subsequent to exposure, the film unit, which may be of the type described in U.S. Pat. No. 3,415,644, is advanced from its exposure position within the container 37 into the bite of a pair of processing rolls 52 (only one of which is shown) and then to the exterior of the camera, as is well known in the art. For an example of suitable apparatus for moving the film unit subsequent to exposure, reference is made to U.S. Pat. No. 3,511,152, granted to I. Erlichman on May 12, 1970. It will be noted that when the reflecting member is in the solid line position, it functions as a component of the camera's viewing system since light now admitted by the shutter and redirected toward the reflecting member 42 by a mirror 54, attached to an interior wall of housing section 14, is again redirected by the echelon-type mirror 50 toward the camera's viewfinder (not shown).

Figure 3:
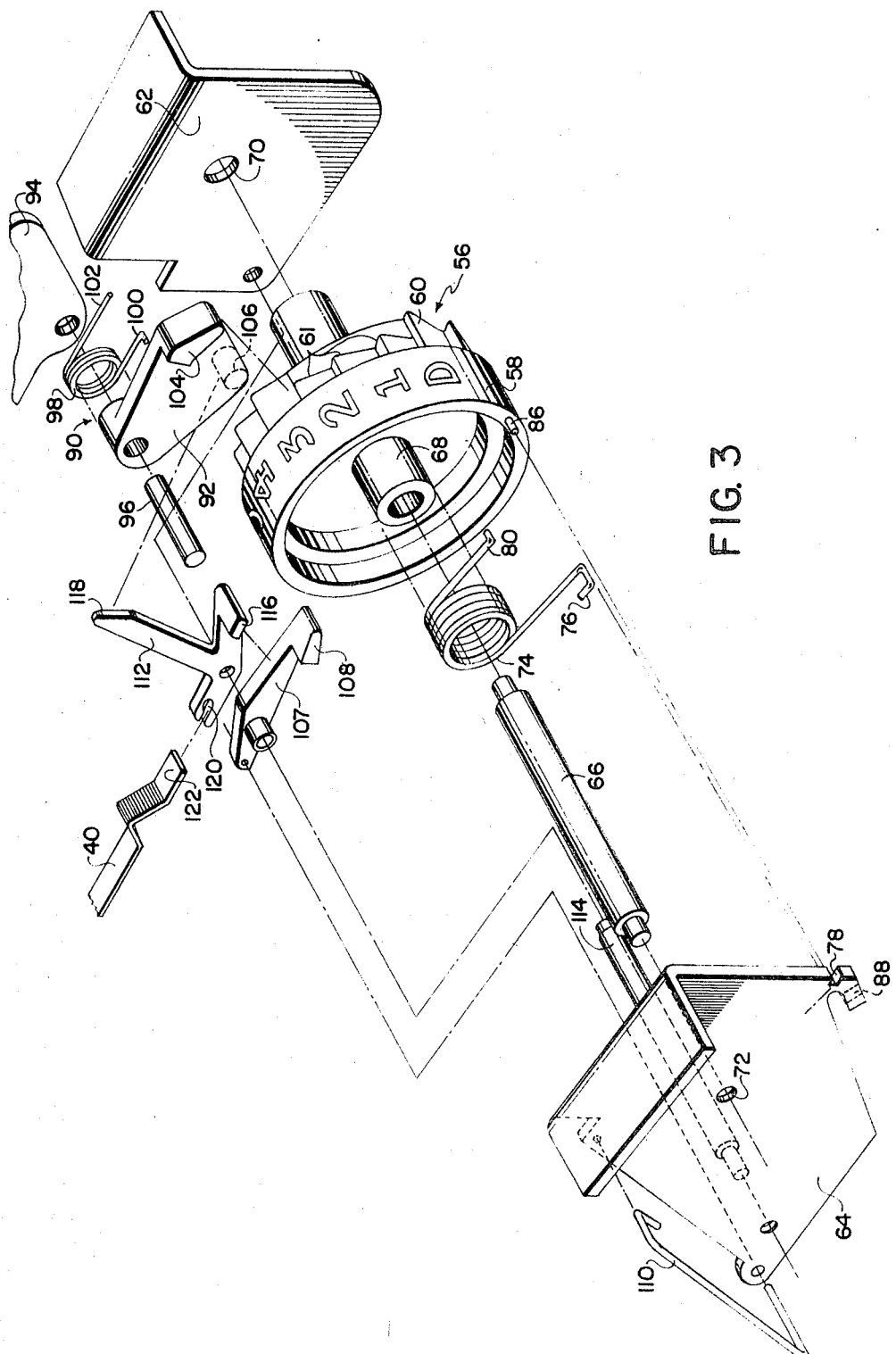
FIG. 3 is an enlarged, exploded perspective view of an exposure counter and its related structure.

In order to inform the user of the camera as to the number of the next film unit to be exposed, the camera is provided with a pose or exposure counter 56 whose movement is correlated with the movement of the reflecting member 42 between the aforementioned first and second positions to ensure that the proper information is available to the user. Exposure counter 56 includes an indicia-bearing member 58 having identifying characters D, 1, 2, 3, 4, 5, 6, 7, 8, 9, 10 and E thereon. "D" designates "dark slide" which refers to a sheet of opaque material that overlies the forwardmost film unit within the film container to prevent exposure thereof, while the film container is out of the camera; the numerals 1–10 designate the number of the film unit which is to be exposed; and "E" designates "Empty." Extending from the indicia-bearing member 58 are a plurality of teeth 60 which define a ratchet wheel for cooperating with suitable indexing means for rotating the indicia-bearing member 58. Member 58 is rotatably mounted between a pair of flanges 62 and 64 by a bearing rod 66 which extends through a boss 68 in member 58, the ends of rod 66 being suitably received by apertures 70 and 72 in flanges 62 and 64, respectively. A rewind spring 74 has one end 76 positioned within a slot 78 in flange 64 and its other end 80 suitably secured to indicia-bearing member 58. Spring 74 is adapted to be wound as the indicia-bearing member 58 is rotated in a clockwise manner (as viewed in FIG. 3) for providing a source of energy for returning the indicia-bearing member 58 to its starting position; i.e., with character "D" appearing at the viewing station or window 82 (see FIG. 2) located in a wall 84 of housing section 12 upon the removal of the film container. Movement of the indicia-bearing member 58 in a counterclockwise manner by spring 74 is limited by a stop pin 86 located on member 58 in position to engage an inwardly extending portion 88 of flange 64. In other words, character "D" is in alignment with window 82 at the moment pin 86 strikes portion 88 of flange 64.

The indicia-bearing member 58 is rotated step-by-step by indexing means 90 in response to movement of the reflecting member between the first and second positions for sequentially advancing the character visible in window 82. Indexing means 90 includes a pawl 92 pivotally coupled by a pin 96 to a flange 94 depending from reflecting member 46. A spring 98 has one end 100 attached to pawl 92 and its other 102 attached to a stationary part of the camera structure for urging pawl 92 in a clockwise direction (as viewed in FIG. 3) into engagement with teeth 60. Extending from one side of pawl 92 is a finger-like member 104 which is adapted to engage teeth 60 and rotate member 58 in a clockwise manner in response to movement of reflecting member 46 between the first or exposure position and the second or viewing position. Extending from the opposite side of pawl 92 is a cam follower 106, the function of which will be explained shortly.

The exposure counter 56 is further provided with means responsive to removal of the film container 37 from the camera for automatically resetting the indicia-bearing member 58 to its starting position. The latter means include a second pawl 107 having a finger 108 biased in a counterclockwise direction by a spring 110 into engagement with one of the teeth 60 on member 58 for preventing counterclockwise rotation of the latter; a reset pawl 112 pivotally mounted about a pivot pin 114 common to the second pawl 107; and spring 40 mounted within housing section 12. Reset pawl 112 includes cam surfaces 116 and 118 for engaging pawl 107 and cam follower 106, respectively, and a slot 120 for receiving the free end 122 of spring 40.

OPERATION

Prior to insertion of a film container 37 into housing section 12, the various parts of the camera and the exposure counter assume the positions shown in FIG. 1. It will be noted that the free end of cantilever spring 40 is originally in a raised position due to the absence of a film container 37 in housing section 12. Insertion of a film container into position within housing section 12 depresses the free end of spring 40, thereby rotating reset pawl 112 in a counterclockwise manner. This latter movement of pawl 112 moves cam surface 116 of reset pawl 112 out of engagement with pawl 107, thereby allowing pawl 107, under the influence of spring 110, to rotate in a counterclockwise manner until finger 108 moves into engagement with one of the teeth 60, and simultaneously therewith moves cam surface 118 out of engagement with cam follower 106, thereby allowing pawl 92 to rotate in a clockwise manner under the influence of spring 98 until finger-like member 104 is in engagement with one of the teeth 60 on indicia-bearing member 58.

The operator now actuates the shutter release button to advance the aforementioned dark slide from container 37. Operation of the shutter release button actuates a circuit for moving reflecting member 42 from the solid line position to the broken line position as shown in FIG. 1. During this upward movement of the reflecting member 42, pivot 96 is carried by flange 94 in a clockwise manner, thereby moving pawl 92 in a similar manner. As pawl 92 moves in a clockwise manner, finger-like member 104 rides up and to the left on a tooth 60 until it falls behind the next preceding tooth 60. It will be noted that this involves a compound movement of cam 92; i.e., clockwise rotation of the pawl 92 about pivot 44 and counterclockwise rotation of pawl 92 about pivot 96 until finger-like member 104 reaches the crest of the tooth 60. Pawl 92 is now in position to index indicia-bearing member 58 upon movement of the reflecting member 42 from the broken line position to the solid line position. Upon reflecting member 42 reaching the broken line or exposure position, the camera's shutter is opened to allow light into chamber 32, said light being reflected by mirror 48 towards the exposure aperture 35 located in support member 34. Upon closure of the shutter, the reflecting member is moved from the broken line or exposure position to the solid line or viewing position as shown in FIG. 1. Downward movement of the reflecting member 42 moves pivot 96 in a counterclockwise manner about pivot 44, thereby moving pawl 92 to the right as viewed in FIG. 2. Movement of pawl 92 to the right causes indicia-bearing member 58 to move in a clockwise manner until the character "D" is moved out of alignment with viewing station 82 and the character "1" appears therein. After the reflecting member 42 has reached the solid line position, any suitable means, such as that shown in the copending application of Irving Erlichman, Ser. No. 67,051, filed Aug. 26, 1970, and assigned to the same assignee as the instant application, may be used for moving the dark slide out of the film container 37 and into the bite of processing rolls 52 for subsequent movement to the exterior of the camera.

This cycle of events is repeated for every actuation of the shutter release button until the indicia-bearing member 58 has been indexed or rotated to a position whereat the character "E" (not shown) located on indicia-bearing member 58 is in alignment with the viewing station 82. If at this time, i.e., when the film container is empty, the user actuates the shutter release button, no further rotation or indexing of the indicia-bearing member 58 will take place because the section of film counter 56 having teeth 61 of a shorter width than those of teeth 60 is now located adjacent finger-like member 104 so as to preclude engagement between the two. Upon removal of the film container from housing section 12, the indicia-bearing member 58 is automatically returned to its starting position; i.e., with character "D" in alignment with viewing station 82. Removal of the film container allows the free end of the cantilever spring 40 to move upwardly, thereby rotating pawl 112 in a clockwise manner, thereby resulting in (1) cam surface 118 engaging cam follower 106 to move pawl 92 and its finger-like member 104 in a counterclockwise direction away from the indicia-bearing member 58, and (2) cam surface 116 engaging pawl 107 to rotate the latter in a clockwise direction until finger 108 is moved out of blocking engagement with teeth 60. Indicia-bearing member 58 is now free to rotate in a counterclockwise direction under the influence of spring 74 until stop pin 86 engages inward engaging position 88 of flange 64. At this time the character "D" is in alignment with viewing station 82.

From the foregoing it can be seen that there has been disclosed a new and unobvious arrangement of parts for indexing a pose or exposure counter in response to the movement of a reflecting member. The structure also includes means responsive to the removal of a film container from the camera for automatically resetting the pose or exposure counter to its starting position.

Although a specific type of folding, single-lens reflex camera has been described herein, it should be understood that the camera may be of the non-folding type and that the indexing of the exposure counter could be responsive to the movement of a conventional reflex member, such as those shown in the aforementioned U.S. Pat. Nos. 2,552,275 and 2,608,922, between its viewing and non-viewing positions for sequentially advancing the character present at the viewing station.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:
   a housing including support means for supporting a film container having a plurality of film units;
   a viewing station;
   an exposure counter including an indicia-bearing member for presenting sequentially changeable characters to said viewing station, said sequentially changeable characters including characters denoting a starting position and an end position;
   reflecting means mounted for movement between first and second positions; and
   means responsive to movement of said reflecting means between said first and second positions for sequentially indexing said indicia-bearing member for changing the character present at said viewing station.

2. Photographic apparatus as defined in claim 1 further including means responsive to removal of a film container from said apparatus for automatically resetting said indicia-bearing member to said starting position.

3. Photographic apparatus as defined in claim 2 wherein said exposure counter includes spring means tensionable by operation of said indexing means for returning said indicia-bearing member to said starting position upon removal of the film container.

4. Photographic apparatus as defined in claim 3 wherein said means responsive to removal of the film container include means for moving said indexing means to a position allowing said indicia-bearing member to return to said starting position.

5. Photographic apparatus as defined in claim 1 wherein said exposure counter includes means for preventing advancement of said indicia-bearing member past said end position.

6. Photographic apparatus as defined in claim 5 wherein said indicia-bearing member includes a rotary, graduated dial having identifying characters thereon and a ratchet wheel connected to said dial and engageable by said indexing means for advancing said ratchet wheel and said dial to sequentially change the character present at said viewing station upon each movement of said reflecting means between said first and second positions.

7. Photographic apparatus as defined in claim 6 wherein said means for preventing advancement of said indicia-bearing member past said end position include a plurality of teeth spaced around the periphery of said ratchet wheel, said teeth being constructed and arranged so as to be non-engageable by said indexing means after said indicia-bearing member has reached said end position.

8. Photographic apparatus as defined in claim 1 wherein said reflecting means is a component of the exposure system of said apparatus when in said first position.

9. Photographic apparatus as defined in claim 1 wherein said reflecting means is a component of the viewing system of said apparatus when in said second position.

10. Photographic apparatus as defined in claim 1 wherein said reflecting means is a component of the exposure system of said apparatus when in said first position and is a component of the viewing system of said apparatus when in said second position.

* * * * *